United States Patent [19]

Kanjo et al.

[11] Patent Number: 4,662,485
[45] Date of Patent: May 5, 1987

[54] RAILWAY VEHICLE BRAKE RIGGING SLACK ADJUSTER

[75] Inventors: Wajih Kanjo, Midlothian; Richard J. Housman, Dolton, both of Ill.

[73] Assignee: American Standard Inc., Chicago, Ill.

[21] Appl. No.: 714,596

[22] Filed: Mar. 21, 1985

[51] Int. Cl.$^4$ ............................................. F16D 65/56
[52] U.S. Cl. .................................. 188/196 D; 188/202
[58] Field of Search .................... 188/202, 203, 196 D; 192/111 A

[56] References Cited

U.S. PATENT DOCUMENTS

| | | | |
|---|---|---|---|
| 3,177,985 | 4/1965 | Rouglas | 188/202 |
| 3,520,387 | 7/1970 | Natschke | 188/202 |
| 3,557,915 | 1/1971 | Pollinger | 188/203 |
| 4,138,002 | 2/1979 | Sander et al. | 188/202 X |

*Primary Examiner*—Andres Kashnikow
*Assistant Examiner*—Richard R. Diefendorf
*Attorney, Agent, or Firm*—J. O. Ray, Jr.

[57] ABSTRACT

The present invention teaches a double-acting compression actuatable slack adjuster to adjust the slack in the brake rigging of a railway vehicle which includes a pair of elongated members movable with respect to each other in a longitudinal direction. One of the elongated members is hollow and the other member includes a threaded portion housed within the hollow member. A positioning device carrying a pair of opposed abutting surfaces is threadedly engaged with the threaded portion of the one member. A pair of opposite facing abutment surfaces are positioned within the hollow member. A first urging device is positioned to urge the positioning device into a disengaged position. A second urging device overcomes the force of the first urging device and urges an abutting surface on the positioning device into engagement with an adjacent abutment surface. An overtravel control device is provided which is activated by a trigger device.

22 Claims, 6 Drawing Figures

RAILWAY VEHICLE BRAKE RIGGING SLACK ADJUSTER

BACKGROUND OF THE INVENTION

The present invention relates in general to slack adjuster assemblies which automatically adjust the slack in the brake rigging of a railway vehicle and, more particularly, the invention relates to a double-acting compression actuable slack adjuster assembly which adjusts the slack in such brake rigging driving each brake application. For a number of years, slack adjusters have been provided in the brake rigging of railway vehicles to automatically adjust the slack in such brake rigging for a number of reasons. One such reason of significance is that the slack adjuster maintains the brake cylinder piston rod travel within a preselected travel distance automatically. Maintaining such brake cylinder piston rod travel distance within the prescribed limit is of particular importance in present day higher speed train operations. In addition, today's trains have a greater number of cars due to better locomotive equipment. For these reasons, it is important that the piston rod travel of the brake cylinder be maintained at a relatively close tolerance in order to properly balance the fluid pressure, usually air, in the fluid cylinder with that in the reservoir. If this were not the case, a car with a long piston rod travel would be operating at a reduced pressure and also at a time lag with respect to other cars in the train makeup that had a proper piston rod travel. On the other hand, a car with a piston rod travel that is too short would be operating at a higher cylinder fluid pressure and at an advanced timing with respect to the other cars exhibiting a proper piston rod travel. Either of the above conditions is undesirable. The above considerations also must be taken into account with respect to the supply of fluid.

Another important reason is that the slack adjusters will provide a substantially more uniform braking force to be applied to each set of wheels on each car making up a train. Because of the improvement in providing a more uniform braking force, the undesirable possibility of some cars in the train being held back while other cars roll ahead is generally minimized.

More recently and of significance in the fact that a slack adjuster has been increasingly used to replace one of the brake cylinders on those railroad cars equipped with truck mounted brake rigging. Due to the elimination of one brake cylinder, in this application considerable cost and desirable weight saving advantages can be achieved. However, the linkages required are generally more complex because the slack adjuster assembly becomes a force transmitting member in such brake riggings. This application for a slack adjuster assembly, however, requires an even greater reliability for a number of obvious reasons.

SUMMARY OF THE INVENTION

This invention teaches a double-acting compression actuable slack adjuster to adjust the slack in a railway vehicle brake rigging. The slack adjuster assembly includes an elongated hollow housing member restrained against rotation and pivotally connectable at a first end thereof to such brake rigging. An elongated rod member restrained against rotation and pivotally connectable at a first end thereof to such brake rigging is also provided and has at least a threaded portion adjacent a second end thereof. The threaded portion of the rod member extends into and is reciprocally movable within the housing through a second end of the housing. A positioning means movable between respective first abutting engagement, disengagement, and second abutting engagement positions is threadably engaged with the threaded portion of the rod member intermediate said ends thereof. The positioning means rotates about the threaded portion of the rod member when in the disengaged position thereby changing the length of the slack adjuster assembly by changing the relative longitudinal position between the housing and the rod member. A pair of opposite facing abutment surfaces positioned within a portion of the housing and a pair of opposed abutting surfaces carried by the positioning means for engaging respective adjacent abutment surfaces to resist rotation of the positioning means about the rod member when the positioning means is in one of the respective abutting engagement positions thereby retarding the change in relative longitudinal position between the housing and the rod member are provided. A first urging means is positioned between the positioning means and an abutment surface carried by the rod member for urging the positioning means into the disengaged position. A second urging means is positioned between the first end of the housing and the positioning means for overcoming a force applied by the first urging means and for urging the positioning means into the first abutting relationship position. An overtravel control means is positioned to reciprocally move in a longitudinal direction adjacent the first end of the housing and is engageable with the second urging means for reducing the force applied by the second urging means to less than the force applied by the first urging means, thereby allowing the positioning means to move to the disengaged position. An overtravel control actuating means is positioned to engage the overtravel control means for actuating the overtravel control means in response to the travel distance of a brake cylinder piston connected to such brake rigging.

OBJECTS OF THE INVENTION

It is, therefore, one of the primary objects of the present invention to provide a double-acting compression actuatable slack adjuster assembly to automatically adjust the slack occurring in the brake rigging of a railway vehicle and which can function as a force-transmitting member in such brake rigging.

Another object of the present invention is to provide a double-acting conpression actuatable slack adjuster assembly which automatically measures and adjusts, in response to such measurement, the slack in the brake rigging during each application stroke of the piston rod of the fluid-pressure-operated brake cylinder.

Still another object of the present invention is to provide a double-acting compression actuatable slack adjuster assembly to adjust the slack in a railway vehicle brake rigging which includes an overtravel control mechanism that can be triggered in a number of ways from a measured travel distance of the brake cylinder piston rod.

Yet another object of the present invention is to provide a double-acting compression actuatable slack adjuster assembly in which the measurement required for triggering the overtravel control assembly can be taken in a number of locations.

A further object of the present invention is to provide a double-acting compression actuatable slack adjuster assembly which can be installed in the brake rigging of a railway vehicle in either one of two positions thereby permitting not only greater flexibility but also reliability in placement of the trigger mechanism which responds to measured brake cylinder piston rod travel distance.

Still yet another object of the present invention is to provide a double-acting compression actuatable slack adjuster assembly in which all of the force urging means are always maintained in compression.

Yet a further object of the present invention is to provide a method of elongating a force-transmitting nonrotatable rigid member.

A still further object of the present invention is to provide a method of elongating a force-transmitting nonrotatable rigid member when such rigid member is used as a double-acting compression actuatable slack adjuster to adjust the slack that occurs in the brake rigging of a railway vehicle.

The above and various other objects and advantages of the methods and apparatus of the present invention will become more apparent to those persons skilled in the railway vehicle brake rigging slack adjuster art from the following more detailed description of the invention when such description is taken in conjunction with the attached numerous drawing figures and the appended claims directed to the present invention.

BRIEF DESCRIPTION OF THE INVENTION

When referring to the numerous drawing Figures, like numerals will be used throughout to indicate identical parts in the various figures.

Figure 1:
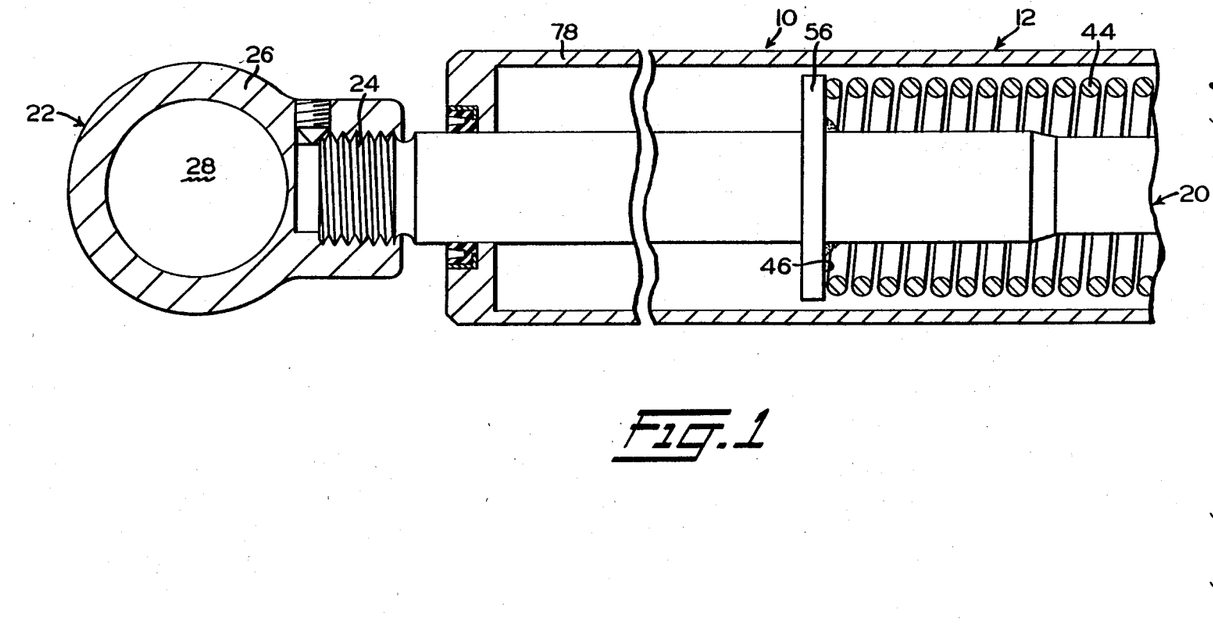
FIGS. 1–3 are a longitudinal cross-sectional view of a double-acting compression actuatable slack adjuster assembly showing a presently preferred embodiment of the invention.
Figure 2:
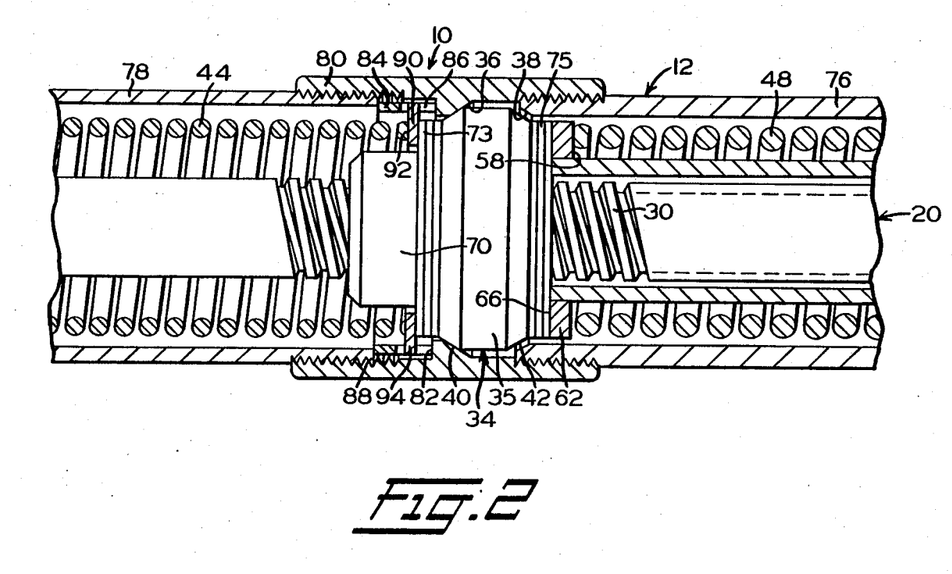
Figure 3:
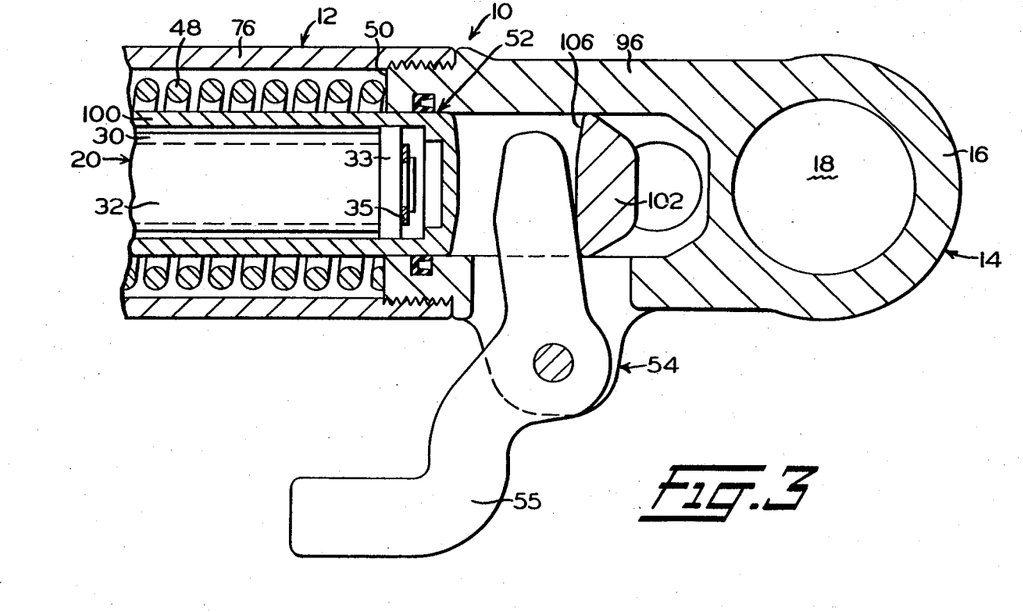

Now referring to FIGS. 1–3, there is shown a double-acting compression actuatable slack adjuster assembly, generally designated 10, to adjust the slack in a railway vehicle brake rigging. According to a presently preferred embodiment of the present invention, the slack adjuster 10 includes an elongated hollow housing member, generally designated 12. The housing member 12 is restrained against rotation and is pivotally connectable at a first end 14 thereof to the brake rigging (not shown) of the railway vehicle by a first eye portion 16 having an aperture 18 formed therein.

An elongated rod member, generally designated 20, is positioned for reciprocal movement within the housing member 12 through a second end 22 of housing member 12. Rod member 20 is restrained against rotation and is pivotally connected at a first end 24 thereof to the railway vehicle brake rigging by a rear eye portion 26 having an aperture 28 formed therein. The rod member 20 has a threaded portion 30 adjacent a second end 32 thereof. Threaded portion 30 extends from the second end 32 of rod member 20 for a predetermined length and is contained within housing member 12. Also adjacent the second end 32 of rod member 20 is a means, such as a collet 33, to maintain the rod member 20 in substantial coaxial alignment with the housing member 12. Collet 33 is held in place by a retainer ring 35.

A positioning means, generally designated 34, is threadedly engaged with the threaded portion 30 of the rod member 20 intermediate the ends thereof. The positioning means 34 is movable between respective first abutting engagement, disengagement and second abutting engagement positions. The positioning means 34 rotates about the threaded portion 30 of rod member 20 when in the disengaged position and thereby changes the length of the slack adjuster assembly 10 by changing the relative longitudinal positions between the housing member 12 and the rod member 20.

A pair of opposite facing abutment surfaces 36 and 38 are positioned within a portion of the housing member 12 intermediate the ends thereof for engagement by a pair of opposed abutting surfaces 40 and 42 carried by the positioning means 34. Abutment surface 36 engages abutting surface 40 in the above-mentioned first abutting engagement position and abutment surface 38 engages abutting surface 42 in the second abutting engagement position. During engagement of respective adjacent abutment surfaces, i.e., 36 with 40 or 38 with 42, rotation of the positioning means 34 about the threaded portion 30 of rod member 20 is resisted and thereby retards the change in relative longitudinal position between the housing member 12 and the rod member 20.

A first urging means, preferably a spring 44, is positioned between the positioning means 34 and an abutment surface 46, carried by the rod member 20, to urge the positioning means 34 into the above-mentioned disengaged position. It should be understood by those skilled in the art that the first urging means could be a fluid cylinder, such as a pneumatic or hydraulic cylinder (not shown).

A second urging means, preferably a spring 48, is positioned between an abutment surface 50 near the first end of the housing member 12 and the positioning means 34. As mentioned above, the second urging means could also be a fluid-operated cylinder (not shown). The second spring 48 is stronger than the first spring 44 so as to overcome the force applied by the first spring 44 and therefore urge the positioning means 34 to the left, as shown in the drawing, with the consequent engagement of abutment surfaces 36 and 40 which is the first abutting relationship position.

An overtravel control mechanism, generally designated 52, is positioned to reciprocally move in a longitudinal direction adjacent the first end 14 of the housing member 12. Overtravel control means 52 is engageable with the second spring 48 in order to reduce the force being applied to such second spring 48 to an amount which is less than the force being applied by the first spring 44. This will allow the positioning means 34 to move to the disengaged position.

An overtravel actuating means, generally designated 54, is positioned to engage the overtravel control means 52 in order to activate the overtravel control means 52 in response to the travel distance of a brake cylinder piston rod (not shown) that is connected to such railway vehicle brake rigging. In the presently preferred embodiment of the invention, the overtravel actuating means 54 is a lever 55. A reference point is established as the piston rod (not shown) of the brake cylinder and compression of the spring 48 is triggered by the lever 55 when this reference point is exceeded.

In the presently preferred practice of the invention, the abutment surface 46 is carried by a first spring seat 56 secured to rod member 20 in a permanent fashion such as by welding, and the first spring 44 is caged between the first spring seat 56 and the positioning means 34. The second spring 48 is caged between the abutment surface 50 located at the first end 14 of the housing member 12, and an abutment surface 58 closely adjacent one end 60 (FIG. 6) of the overtravel control means 52. The abutment surface 58 is preferably carried by a second spring seat 62. The second spring seat 62 engages a first ledge portion 64 (FIG. 6) which extends outwardly from the outer periphery of the overtravel control means 52 closely adjacent the end 60 on an opposed side 66 of spring seat 62.

The load rating of the second spring 48 is greater than the load rating of the first spring 44 and is preferably in the range of at least between about 2.0 and 3.0 times greater. On the other hand, the free height of the first spring 44 is greater than the second spring 48 and preferably it has a free height of at least between about 1.5 and 1.8 times greater free height.

Figure 4:
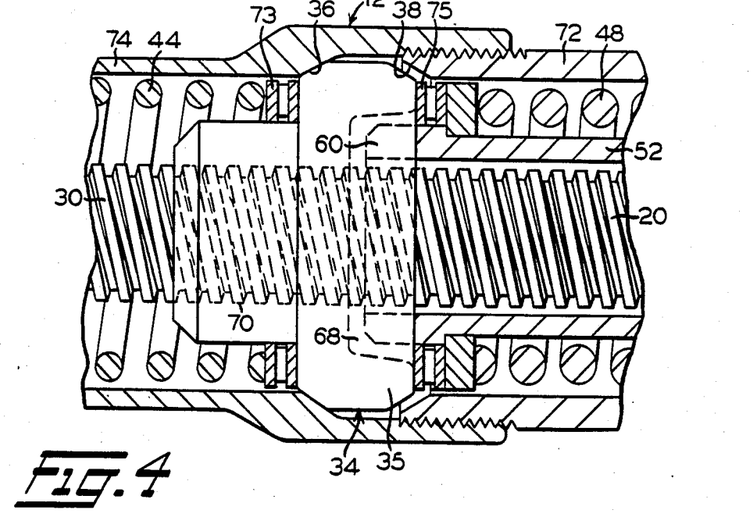
FIG. 4 is a fragmentary view in cross-section which shows a two-piece housing connection for a double-acting compression actuatable slack adjuster assembly according to the present invention.
Figure 5:
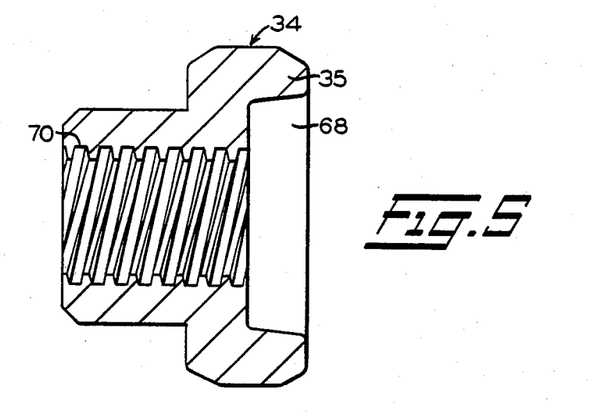
FIG. 5 is a cross-sectional view of a presently preferred positioning means used in the slack adjuster of the present invention.

As shown in FIGS. 2, 4 and 5 according to the present embodiment, the positioning means 34 is a cone lock nut 35. Cone lock nut 35 includes a recessed area 68 for receiving the end 60 of overtravel control means 52. Cone lock nut 35 also has an extended and internally threaded portion 70 which extends into first spring 44 adjacent one end. Extended portion 70 provides a greater threaded portion for cone lock nut 35 and controls somewhat the speed of rotation of such cone lock nut 35.

In the preferred practice of the invention, a pair of thrust bearings 73 and 75 are placed in contact with a respective side of the cone lock nut 35 to permit free rotation of such cone lock nut 35 about the threaded portion of rod member 20.

As best shown in FIG. 4, the elongated hollow housing member 12 includes a first housing portion 72 which houses a portion of the threaded portion 30 of the rod member 20, the overtravel control means 52, and the second spring 48. The housing member 12 also includes a second housing portion 74 which is removably engaged with first housing portion 72. Second housing portion 74 houses a portion of the rod member 20 including the remaining portion of the threaded portion 30 of rod member 20 and the first spring 44. The cone lock nut 35 is positioned substantially at the juncture of first housing portion 72 and second housing portion 74. The first housing portion carries one of the opposite facing abutment surfaces 38, and the second housing portion 74 carries the other of the opposite facing abutment surfaces 36.

The presently preferred housing member 12, shown in FIGS. 1-3, includes a first housing portion 76 which houses a portion of the threaded portion 30 of rod member 20, the overtravel control means 52 and the second spring 48. Housing member 12 also includes a second housing portion 78 which houses a portion of the rod member 20 including the remaining portion of the threaded portion 30 and the first spring 44. A third housing portion 80 couples the first housing portion 76 with the second housing portion 78 and housing a third portion of the threaded portion 30 of rod member 20 and the cone lock nut 35. In the housing member 12 arrangement, shown in FIGS. 1-3, the first housing portion 76 carries one of the pair of opposite facing abutment surfaces 38 and the third housing portion 80 carries the other of the opposite facing abutment surfaces 36. The third housing portion 80 includes a second ledge portion 82 extending inwardly and facing the second housing portion 78.

A sleeve member 84 having at least one longitudinal guide slot 86 formed therein is tightly positioned between the second ledge portion 82 and one end 88 of the second housing portion 78. A third spring seat 90 is positioned for reciprocal movement intermediate one end 92 of the first spring 44 and the thrust bearing 73 adjacent cone lock nut 35. The third spring seat 90 includes at least one lug portion 94 which extends in an outwardly direction from the outer periphery of the spring seat 90 to cooperate with the guide slot 86 to prevent windup of the first spring 44.

In all of the presently preferred embodiments of the invention, the housing member 12 is cylindrical in cross-section. An elongated hollow cylindrical portion 96 is removably engaged intermediate the end 14 and first housing portion 76 or 72 which allows reciprocal movement of the overtravel control means 52. There is at least one opening through the wall of the cylindrical portion 96 to permit the actuating means 54 to engage the overtravel control means. The eye portion 18 is formed as a single-piece casting with the cylindrical portion 96. Eye portion 18 allowing such pivotal connection and at the same time restraining the first end 14 against rotation.

Figure 6:
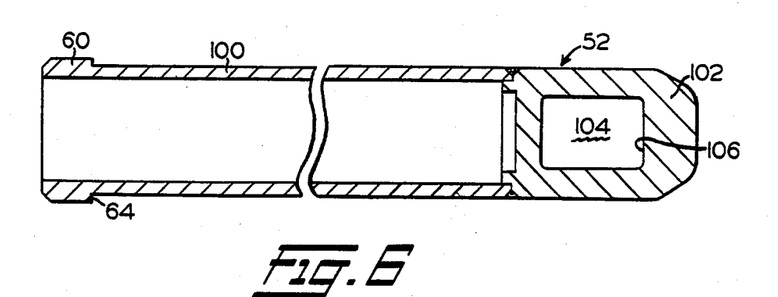
FIG. 6 is a longitudinal cross-sectional view of a presently preferred overtravel control housing used in the present invention.

As shown in FIG. 6, the overtravel control means 52 includes an elongated hollow cylindrical portion 100 having the first ledge portion 64 at one end 60 positioned between the threaded portion 30 of the rod member 20 and the second spring 48. A generally solid portion 102 is secured to the overtravel control cylindrical portion 100 and is reciprocally movable within the cylindrical portion 96 connected to end 14. An opening 104 is provided in the generally solid portion 102 which provides the abutment surface 106 for engaging the actuating means 54.

The present invention further has utility as a method for elongating a force-transmitting nonrotatable rigid member. In this application, the method includes the steps of applying a first predetermined force to a rotatable means 34 threadedly engaged with an elongated and at least partially threaded (30) rod member 20 that has been restrained against rotation at one end 24 thereof. Urging with the first force, a first abutment surface 40 carried by the rotatable means 34 against an abutment surface 36 carried by a housing 12 which extends over and in coaxial alignment with the rod member 20. The housing 12 is restrained against rotation at one end 14 thereof opposite the restrained end 24 of the rod member 20. A second predetermined force, which is less than the first predetermined force, is applied to the rotatable means 34 diametrically opposite the first force. The first predetermined force is then reduced to an amount less than the second predetermined force. This causes the rotatable means 34 to rotate on the threaded portion 30 of the rod member 20 due to the second force urging the rotatable means 34 in a direction that causes disengagement of abutment surfaces 36 and 40. The nonrotatable rigid member is elongated, therefore, by changing the relative longitudinal position between the rod member 20 and the housing 12 through the rotation of rotating means 34 along the threaded portion 30 of rod member 20.

In the presently preferred practice of the method, the first predetermined force has a minimum load rating of between about 625 and 675 pounds, and the second predetermined force has a minimum load rating of between about 300 and 325 pounds.

The operation of the invention as a railway vehicle brake rigging slack adjuster will now be described for three conditions. One condition where no let-out is required (no shoe wear), the second condition where let-out is required (shoe wear), and the third condition is take-up required (adding shoes).

The slack adjuster assembly 10 is connected at ends 14 and 24 to the brake rigging (not shown) in a collapsed condition as shown in FIGS. 1-3. Ends 14 and 24 allow the assembly 10 to pivot about apertures 18 and 28 while restraining the assembly 10 against rotation.

The sequence of steps for the first condition of no let-out required is as follows. The brake cylinder piston rod (not shown) is actuated and begins to move the brake shoes into contact with an adjacent wheel (not shown). At predetermined piston travel, as the shoes contact the wheel, the actuating lever 55 is activated and moves the overtravel control means 52 in a direction to compress spring 48. Any further piston travel causes a compression force through the rod 20, at the same time compressing spring 48, thereby allowing spring 44 to move the positioning means 34 from the abutment surface 36 and engage abutment surface 38 of housing 12 and lock-up as a solid rod in compression, causing no changes.

The sequence of steps for the second condition where there is a let-out require the brake cylinder piston to be actuated and begin to move the brake shoes toward the wheel. At the predetermined piston travel, the actuating lever 55 is activated to move the overtravel control means 52 in a direction to compress spring 48. When the effective load of spring 48 against rotatable positioning means 34 is less than the load on spring 44, spring 44 will force positioning means 34 away from abutment surface 36. The positioning means 34 will start rotating and allow spring 44 to move rod 20 out of housing 12, and move the brake shoes into contact with the wheel.

Any further piston travel will cause a compression force through rod 20, at the same time compressing spring 48, thereby allowing spring 44 to move the positioning means to set against abutment surface 38 and lock.

The sequence of steps for the third condition where worn shoes have to be replaced:

The brake cylinder piston rod is actuated and moves the brake shoes toward the wheel. Before actuating the actuating lever 55, the shoes contact the wheel and the reaction force is transmitted to rod 20 and combines with spring 44 to overcome spring 48 and force the positioning means 34 to disengage from the abutment surface 36 of housing 12. Spring 48 still has more force on positioning means 34 than spring 44. That force will try to seat positioning means 34 on abutment surface 36 by rotating positioning means 34 and that will allow rod 20 to move into housing 12. When piston rod travel reaches the predetermined travel, the actuating lever 55 will be actuated, therefore, spring 48 will be compressed and allow positioning means 34 to contact the abutment surface 38 and lock.

Although both the presently preferred and a number of alternative embodiments of the present invention have been shown in the various views of the drawings and briefly described above, it will be obvious to those persons skilled in the railway vehicle brake slack adjuster art that various other modifications and adaptations can be made without departing from the spirit of the invention and the scope of the attached claims.

We claim:

1. A double-acting compression actuatable slack adjuster to adjust the slack in a railway vehicle brake linkage, said slack adjuster assembly comprising:
   (a) an elongated hollow cylindrical housing member which is restrained against rotation and pivotally connectable at a first end thereof;
   (b) an elongated rod member which is restrained against rotation and pivotally connectable at a first end thereof, said rod member having at least a portion thereof threaded, said threaded portion of said rod member extending into said housing member through a second end of said housing member;
   (c) a pair of opposite facing abutment surfaces positioned within a portion of said housing member;
   (d) a cone lock nut positioning means threadedly engaged with said threaded portion of said rod member intermediate a first and second end thereof, said positioning means axially movable between said abutment surfaces into respective first, second, and third positions for rotating about said threaded portion of said rod member when said positioning means is in said second position, thereby changing the length of said slack adjuster assembly by changing the relative longitudinal position between said housing member and said rod member;
   (e) a pair of opposed abutting surfaces carried by said positioning means for engaging respective adjacent abutment surfaces on said housing member to resist rotation of said positioning means about said rod member when said positioning means is in one of said first and said third positions;
   (f) a first spring urging means caged between said positioning means and a first spring seat carried by said rod member for urging said positioning means into said second position in disengagement from said abutment surfaces on said housing member;
   (g) a second spring urging means caged between said first end of said housing an an abutment surface closely adjacent one end of a second spring seat for overcoming a force applied by said first urging means and for urging said positioning means into said first position, said second spring urging means having a load rating at least between about 2.0 and 3.0 times greater than the load rating of said first spring urging means;
   (h) an overtravel control means having a portion axially reciprocal within said first end of said housing member for reducing the force applied by said second spring urging means to a force less than that applied by said first spring urging means, allowing said positioning means to move to said second position in response to overtravel, said overtravel control means having a first ledge portion extending outwardly from an outer periphery thereof closely adjacent said one end which is engageable with said second spring seat;
   (i) an elongated hollow cylindrical portion removably engageable with said first end of said housing member for allowing reciprocal movement of said overtravel control means;

(j) at least one opening through the wall of said cylindrical portion for permitting an actuating means to engage said overtravel control means; and (k) an eye portion formed as a single-piece casting with said cylindrical portion for pivotally connecting and restraining against rotation of said first end of said housing member.

2. A railway vehicle brake rigging slack adjuster assembly, according to claim 1, wherein said first spring seat is permanently secured to said rod member.

3. A railway vehicle brake rigging slack adjuster assembly, according to claim 1, wherein said first spring urging means has a free height of at least between about 1.5 and 1.8 times greater than the free height of said second spring urging means.

4. A railway vehicle brake rigging slack adjuster assembly, according to claim 1, wherein said elongated hollow cylindrical housing member comprises:

(a) a first housing portion housing a portion of said threaded portion of said rod member, said overtravel control means and said second spring urging means; and (b) a second housing portion removably engageable with said first housing portion housing a portion of said rod member including the remaining portion of said threaded portion and said first spring urging means.

5. A railway vehicle brake rigging slack adjuster assembly, according to claim 4, wherein said first housing portion carries one of said pair of opposite facing abutment surfaces and said second housing portion carries the other of said pair of opposite facing abutment surfaces.

6. A railway vehicle brake rigging slack adjuster assembly, according to claim 1, wherein said elongated hollow cylindrical housing member comprises:

(a) a first housing portion housing a portion of said threaded portion of said rod member, said overtravel control means and said second spring urging means;

(b) a second housing portion housing a portion of said rod member including a second portion of said threaded portion and said first spring urging means; and (c) a third housing portion coupling said first housing portion with said second housing portion and housing a third portion of said threaded portion of said rod member and said cone lock nut.

7. A railway vehicle brake rigging slack adjuster assembly, according to claim 6, wherein said first housing portion carries one of said pair of opposite facing abutment surfaces and said third housing portion carries the other of said pair of opposite facing abutment surfaces.

8. A railway vehicle brake rigging slack adjuster assembly, according to claim 7, wherein said slack adjuster assembly further comprises:

(a) a second ledge portion extending inwardly from and carried by said third housing portion and facing said second end of said housing member;

(b) a sleeve member having at least one longitudinal guide slot formed therein tightly positioned between said second ledge portion and one end of said second housing portion; and (c) a third spring seat positioned for reciprocal movement intermediate one end of said first spring urging means and said cone lock nut, said third spring seat including at least one lug portion extending outwardly from the outer periphery of said third spring seat to cooperate with said guide slot for preventing rotation of said third spring seat and thereby preventing wind-up of said first spring urging means.

9. A railway vehicle brake rigging slack adjuster assembly, according to claim 1, wherein said slack adjuster assembly further comprises a means connected to said second end of said rod member for maintaining said rod member in substantially coaxial alignment with said housing member.

10. A railway vehicle brake rigging slack adjuster assembly, according to claim 1, wherein said overtravel control means comprises:

(a) an elongated hollow cylindrical portion having said first ledge portion at said one end positioned between said threaded portion of said rod member and said second spring urging means;

(b) a generally cylindrical solid portion secured to said elongated hollow cylindrical portion and reciprocally movable within said cylindrical portion connected to said eye portion; and (c) an engaging surface formed by providing an opening in said solid portion for engaging said actuating means.

11. A railway vehicle brake rigging slack adjuster assembly, according to claim 10, wherein said actuating means is a lever.

12. A method of elongating a force-transmitting nonrotatable rigid member, said method comprising the steps of:

(a) applying a first predetermined spring force to a rotatable means threadedly engaged with an elongated and at least partially threaded rod member that is restrained against rotation at one end thereof;

(b) urging with said first spring force applied in step (a), a first abutment surface carried by said rotatable means against an adjacent abutment surface carried by a housing extending over and in coaxial alignment with said rod member and restrained against rotation at one end thereof opposite said restrained end of said rod member;

(c) applying a second predetermined spring force less than said first spring force to said rotatable means on a surface adjacent said first abutment surface;

(d) reducing said first predetermined spring force to an amount less than said second predetermined spring force by compressing a spring applying said first predetermined spring force;

(e) rotating said rotatable means on said threaded rod with said second force applied in step (c); and (f) elongating said nonrotatable rigid member by changing the relative longitudinal position between said rod member and said housing through said rotation of said rotatable means in step (e).

13. A method of elongating a force-transmitting nonrotatable rigid member, according to claim 12, wherein said rotating said rotatable means in step (e) includes the step of elongating the spring applying said second predetermined force in step (c) when said spring is compressed to a predetermined length.

14. A method of elongating a force-transmitting nonrotatable rigid member, according to claim 13, wherein said first predetermined force is between about 2.0 and 3.0 times greater than said second predetermined force.

15. A method of elongating a force-transmitting nonrotatable rigid member, according to claim 14, wherein said first predetermined force has a minimum load rating of between about 625 and 675 pounds and said second predetermined force has a minimum load rating of between about 300 and 325 pounds.

16. A method of elongating a force-transmitting nonrotatable rigid member, according to claim 13, wherein said method includes the additional step of applying a third predetermined force to said rod member in an amount at least sufficient to move a second abutment surface carried by said rotatable means against a second adjacent abutment surface carried by said housing thereby preventing further rotation of said rotatable means and further elongation of said force-transmitting nonrotatable rigid member.

17. A method of elongating a force-transmitting nonrotatable rigid member, according to claim 16, wherein said method includes the additional steps of:
 (a) establishing a reference point for initiating compression of said spring; and
 (b) triggering said compression of said spring when said reference point is exceeded.

18. A method of elongating a force-transmitting nonrotatable rigid member, according to claim 17, wherein said force-transmitting nonrotatable rigid member is a railway vehicle brake rigging slack adjuster and said method includes the additional step of measuring the travel distance of a brake cylinder piston rod for establishing said reference point.

19. A method of elongating a force-transmitting nonrotatable rigid member, according to claim 18, wherein said third predetermined force is applied to said rod member when the brake shoes are brought into braking contact with a respective wheel.

20. A method of elongating a force-transmitting nonrotatable rigid member, according to claim 19, wherein said method includes the additional step of shortening said slack adjuster after installation of new brake shoes on such railway vehicle brake rigging.

21. A method of elongating a force-transmitting nonrotatable rigid member, according to claim 20, wherein said step of shortening said slack adjuster includes the steps of:
 (a) substantially equalizing said first predetermined force with said second predetermined force;
 (b) disengaging said abutment surfaces carried by said rotatable means with said adjacent abutment surfaces carried by said housing;
 (c) rotating said rotatable means with respect to said housing in a direction which shortens the length of said slack adjuster; and
 (d) increasing said first predetermined force thereafter to maintain said slack adjuster in the shorter length.

22. A method of elongating a force-transmitting nonrotatable rigid member, according to claim 21, wherein said method includes the step of maintaining both said first and said second predetermined force applying springs in constant compression.

* * * * *

UNITED STATES PATENT AND TRADEMARK OFFICE
CERTIFICATE OF CORRECTION

PATENT NO. : 4,662,485
DATED : May 5, 1987
INVENTOR(S) : Wajih Kanjo et al

It is certified that error appears in the above–identified patent and that said Letters Patent are hereby corrected as shown below:

Column 8, Claim 1, clause (g), line 44, delete "an", first occurrence, and insert --and--

Signed and Sealed this

Twenty-seventh Day of October, 1987

Attest:

DONALD J. QUIGG

*Attesting Officer*  *Commissioner of Patents and Trademarks*